(12) United States Patent
Chen et al.

(10) Patent No.: US 11,534,675 B2
(45) Date of Patent: Dec. 27, 2022

(54) AUTO-BALACING TRANSPORTATION DEVICE WITH STABLE PLATFORM PIVOT AXES

(71) Applicants: Shane Chen, Camas, WA (US); Ywanne Chen, Camas, WA (US)

(72) Inventors: Shane Chen, Camas, WA (US); Ywanne Chen, Camas, WA (US)

(*) Notice: Subject to any disclaimer, the term of this patent is extended or adjusted under 35 U.S.C. 154(b) by 392 days.

(21) Appl. No.: 16/739,096

(22) Filed: Jan. 9, 2020

(65) Prior Publication Data

US 2020/0261786 A1 Aug. 20, 2020

Related U.S. Application Data

(60) Provisional application No. 62/790,339, filed on Jan. 9, 2019.

(51) Int. Cl.
*A63C 17/12* (2006.01)
*B62K 11/00* (2006.01)
*B62J 45/415* (2020.01)
*A63C 17/01* (2006.01)

(52) U.S. Cl.
CPC ............ *A63C 17/12* (2013.01); *A63C 17/014* (2013.01); *B62J 45/4151* (2020.02); *B62K 11/007* (2016.11); *A63C 2203/12* (2013.01); *A63C 2203/18* (2013.01); *B60L 2200/16* (2013.01); *B60L 2240/22* (2013.01); *B60L 2260/34* (2013.01)

(58) Field of Classification Search
CPC .... A63C 17/12; B62K 11/007; B60L 2260/34
See application file for complete search history.

(56) References Cited

U.S. PATENT DOCUMENTS

| | | | |
|---|---|---|---|
| 8,807,250 B2 | 8/2014 | Chen | |
| 2009/0266629 A1 | 10/2009 | Simeray | |
| 2011/0067935 A1* | 3/2011 | Gomi | B60L 1/003 180/21 |
| 2016/0185412 A1* | 6/2016 | Zuo | B60L 15/20 180/218 |
| 2016/0325801 A1* | 11/2016 | Artemev | B60L 50/64 |
| 2016/0339328 A1 | 11/2016 | Simeray | |
| 2017/0008590 A1* | 1/2017 | Artemev | B62K 11/007 |
| 2017/0217526 A1* | 8/2017 | Zhang | B62K 1/00 |
| 2017/0334501 A1* | 11/2017 | Lin | B62M 7/12 |
| 2018/0215434 A1* | 8/2018 | Chen | B62J 25/04 |
| 2019/0241228 A1* | 8/2019 | Hadley | B62K 5/02 |
| 2021/0269116 A1* | 9/2021 | Butenko | B62K 1/00 |

* cited by examiner

*Primary Examiner* — Brian L Swenson

(57) ABSTRACT

An auto-balancing transportation device having a wheel structure and foot platforms that pivot between an in-use and a stowed position. The pivot axis for each platform is provided within the wheel structure so that the force exerted by a rider when stepping on a foot platform is applied to the wheel structure at a point within the wheel structure, as opposed to external to it, which is unstable and may cause the device to tip over.

20 Claims, 2 Drawing Sheets

AUTO-BALACING TRANSPORTATION DEVICE WITH STABLE PLATFORM PIVOT AXES

CROSS REFERENCE TO RELATED APPLICATIONS

The present application claims the benefit of provisional application No. 62/790,339, filed Jan. 9, 2019, entitled Foot Support Hinge Inside Wheel Envelope for Personal Vehicles, and having Ywanne Ying Chen as inventor.

FIELD OF THE INVENTION

The present invention related to central wheel structure auto-balancing transportation devices and, more specifically, to such devices with foldable foot platforms.

BACKGROUND OF THE INVENTION

The prior art includes several auto-balancing transportation devices. These include the Segway, developed by Kamen et al and disclosed in U.S. Pat. No. 6,302,230 (among others), the Solowheel, by Chen (U.S. Pat. No. 8,807,250) and Hovertrak, also by Chen (U.S. Pat. No. 8,738,278). These three patents are hereby incorporated by reference as though disclosed in their entirety herein.

FIG. 1 shows a prior art auto-balancing device 10. Device 10 may include a wheel structure 20 with two tires 21,31, a first foot platform and a second foot platform 22,32, a motor (obscured from view) which drives the wheel structure, a position sensor 16 (which may be gyroscopic or other) and a control circuit 18. Data from the position sensor is used by the control circuit to drive the motor towards dynamically self-balancing the device.

The foot platforms 22,32 can pivot between an in-use position and a stowed position at axis 41,42, respectively. In the in-use position (shown in FIG. 1), the foot platforms extend laterally outward from the sides of wheel structure so that the wheel structure is between the rider's legs. In the stowed position, the foot platforms are folded up, vertically flush with the remainder of the housing 51. The pivot axes 41,42 of the foot platforms are oriented parallel to the direction of travel of the device. In the prior art, the pivot axes are located outwardly of the tires and the housing 51.

A problem exists with this device during mount and dismount. The device is typically mounted one foot at a time. When a foot is placed on a platform, the weight of the rider is transferred to the foot platform and its pivot axis. The downward force at the axis and its position outside of the wheel structure causes the wheel structure to tip, as shown in FIG. 2. In this position, it is difficult to mount the device. The second foot platform is in an awkward position and the device is unstable. Further, the device may tip over all the way, landing on a rider's foot.

A need exits for an easier and more controllable mount and dismount of this type of auto-balancing device.

SUMMARY OF THE INVENTION

Accordingly, it is an object of the present invention to overcome the shortcomings of the prior art.

It is another object of the present invention to provide an auto-balancing device with a platform and wheel structure arrangement that is more stable and makes mount and dismount easier and safer.

It is also an object of the present invention to provide such a device in which the platform pivot axes are within the wheel structure.

These and related objects of the present invention are achieved by use of an auto-balancing transportation device with more stable platform pivot axes as described herein.

The attainment of the foregoing and related advantages and features of the invention should be more readily apparent to those skilled in the art, after review of the following more detailed description of the invention taken together with the drawings.

DETAILED DESCRIPTION

Figure 1:
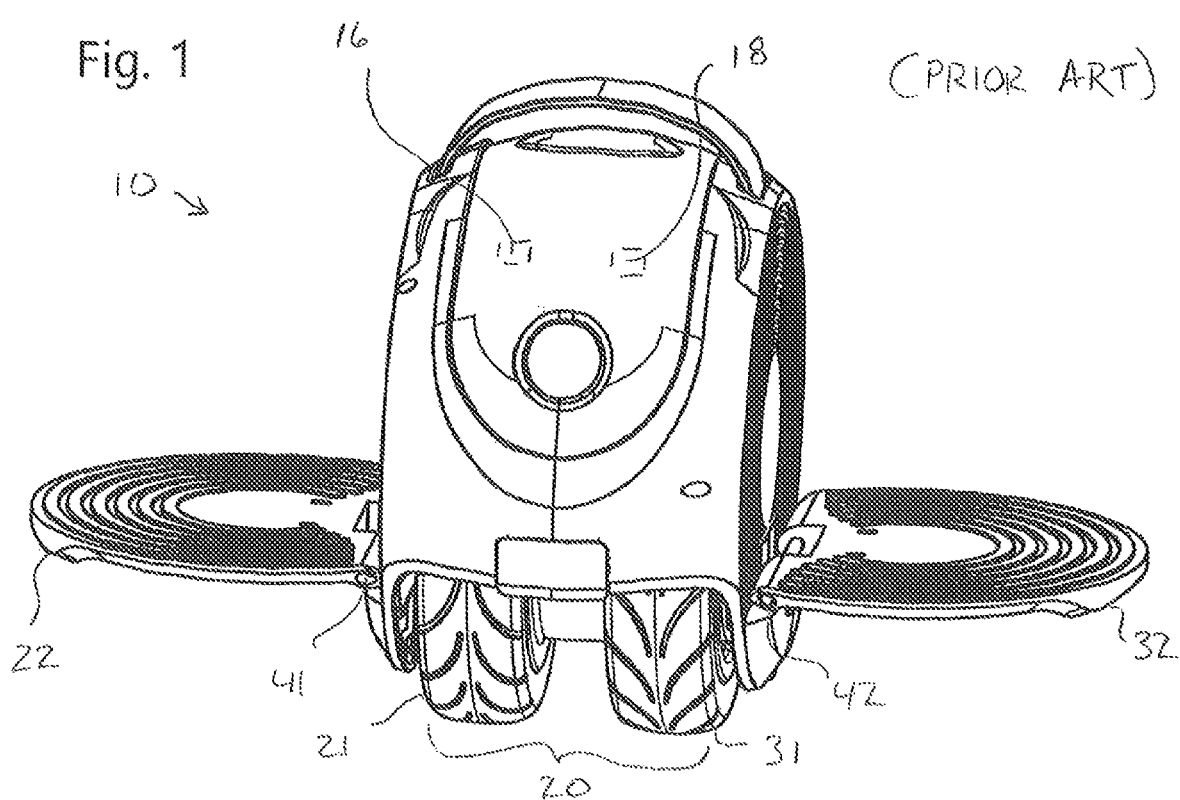
FIGS. 1-2 are a perspective view and a front elevation view (in a leaning position) of a prior art auto-balancing transportation device.
Figure 3:
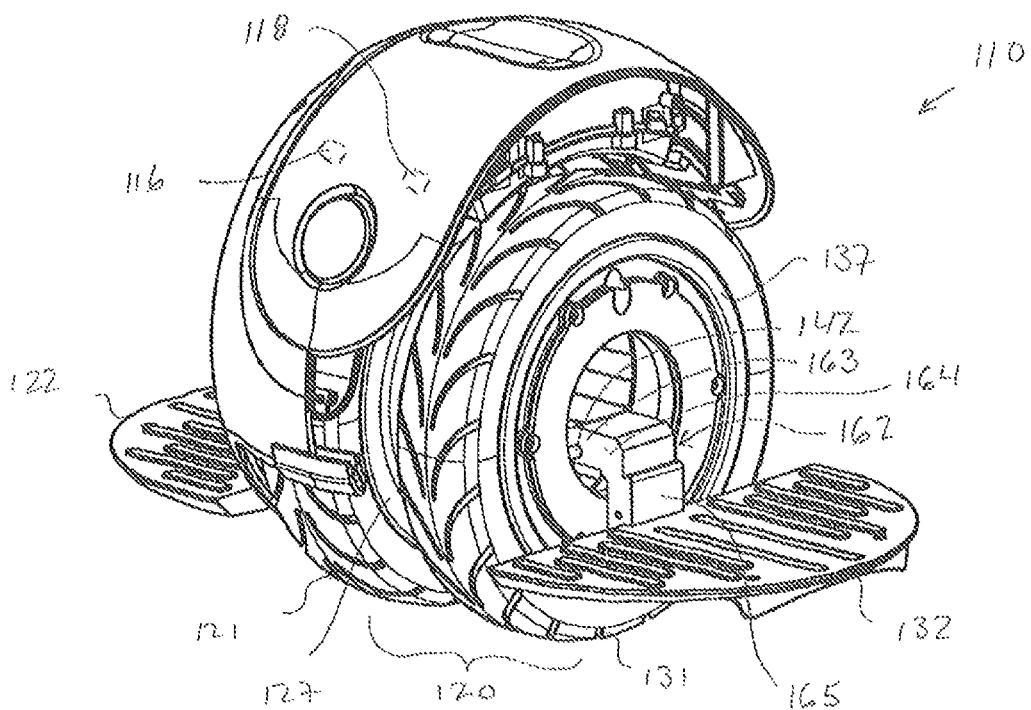
FIGS. 3-4 are a perspective view and a front elevation view (in a leaning position) of an auto-balancing transportation device in accordance with the present invention.
Figure 2:
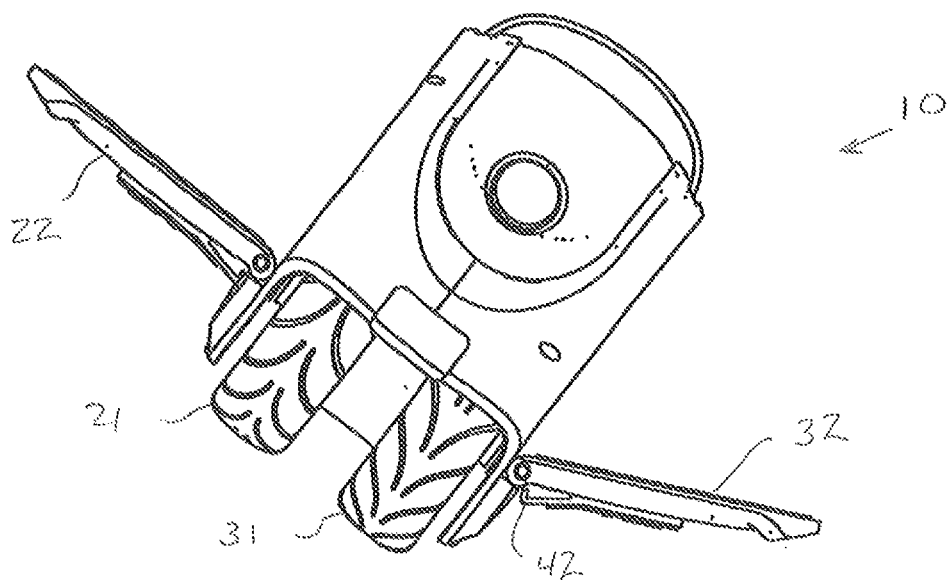

Referring to FIG. 3, an auto-balancing transportation device 110 in accordance with the present invention is shown. Similar to device 10, device 110 may include a wheel structure 120 with two tires 121,131, a first foot platform and a second foot platform 122,132, a motor (obscured from view) which drives the wheel structure, a position sensor 116 (which may be gyroscopic or other) and a control circuit 118. Wheel structure 120 may include rims 127,137 on which tires 121,131 are respectively mounted. Data from the position sensor is used by the control circuit to drive the motor towards dynamically self-balancing the device.

Device 110 solves the problem of the prior art by placing the pivot axes 141,142 of the foot platforms within wheel structure 120. In the embodiment of FIG. 3, axis 142 is placed within the envelope of tire 131. Axis 141 is similarly within the envelope of tire 121.

When device 110 is standing vertically on the ground, a vertical line from pivot axis 142 to the ground intersects tire 131 (and for axis 141, tire 121). Compared to the prior art, this configuration relocates the force applied to the pivot axis by the rider's weight. The location of the pivot axis inside the wheel envelope means that instead of the wheel structure experiencing the force of the rider's weight as downward torque originating from a point outside the wheel structure, the force is exerted upon the wheel structure at a point within the wheel structure. This allows the foot platform to remain fully unfolded during mount and dismount as shown in FIG. 4.

Platform mounting arms 161,162 connect the platforms 122,132 to their respective axes 141,142. In FIG. 4, it can be seen that arm 162 extends from inside the wheel structure to outside of it, and then angles downward to platform 132. The drop distance of arm 162 is preferably the distance axis 142 is within the wheel structure plus a buffer. The drop distance serves to further stabilize device 110 during mounting by placing platform 131 closer to the ground. This lessens the sideways tilt of the platform, making the device more stable and makes it easier to for a rider to place their foot on the other platform 121. In addition, more rider weight is exerted on the wheel structure, reducing the risk that the wheel structure might tip over onto the rider's foot.

Figure 4:
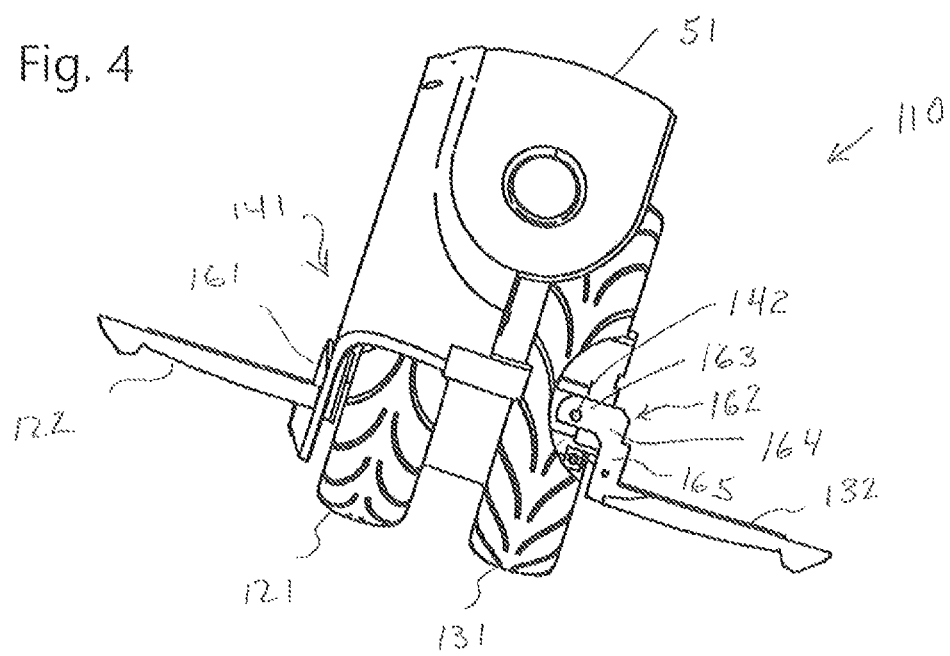

As shown in FIGS. 3-4, arm 162 has a mount portion or member 163 that is configured for pivotal movement about axis 142, a portion 164 that extends outwardly therefrom and then a portion 165 that descends downward to the foot platform. FIG. 3 shows a protrusion extending into mount member 163 along axis 142.

In different embodiments, depending on the tilt angle when mounting and dismounting the device, the location of pivot axes 141,142 may be farther inward within wheels 121,131. In general, pivot axis 141,142 may be placed at a location within the wheel structure that does not cause the foot support to fold when only one of the rider's feet is in place. The optimal pivot axis location may vary slightly from embodiment to embodiment, but will be within the wheel structure.

Device 110 has left and a right vertical planes that touch the outside of tires 121,131, respectively. The pivot axes 141,142 are preferably at or within the left and right side vertical planes. To say that an axis is within the wheel structure means that it is within the volume defined by these planes and the circumferential parts of tires that comprise the wheel structure. If there is only one tire, the vertical planes touch the two outer sides of that tire.

Wheel envelope refers to the volume defined the exterior of a given tire. It is the volume bounded by vertical planes touching the two sides of that tire and the outer circumferential parts of the tire.

The present invention is applicable not only to devices having a single wheel structure and two tires as shown in FIGS. 1-4, but also to a variety of device types which may differ in number of wheels or wheel structures, number of tires, self-balancing or not, and other variables.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

The invention claimed is:

1. An auto-balancing transportation device, comprising:
a wheel structure having at least a first tire and a first rim to which the first tire is mounted;
a motor that drives the wheel structure;
first and second foot platforms that are located on opposite sides of the wheel structure and that pivot between an in-use position and a stowed position;
a position sensor and a control circuit, the control circuit driving the motor towards auto-balancing the device based on data from the position sensor;
a first mounting arm structure that mounts the first foot platform to a first pivot axis and a second mounting arm structure that mounts the second foot platform to a second pivot axis, the first and second pivot axes located within the envelope of the wheel structure;
wherein the first rim has an inner diameter and the longitudinal length of the first foot platform is greater than that inner diameter; and
wherein, when the device is vertical and in the in-use position, the level of the first foot platform is below the level of the first pivot axis and the level of the second foot platform is below the level of the second pivot axis.

2. The device of claim 1, wherein the first pivot axis is located within an envelope of the first rim.

3. The device of claim 1, wherein the wheel structure includes a second tire, and the first and second tires are arranged in parallel.

4. The device of claim 3, wherein the first tire defines a first vertical plane that touches a side of the first tire furthest from the second tire, and the second tire defines a second vertical plane that touches a side of the second tire furthest from the first tire; and
wherein the first and second pivot axes are located between the first and second vertical planes.

5. The device of claim 1, wherein the first mounting arm structure includes a first pivot mount member that affords, at least in part, pivotal movement of the first foot platform between the in-use and the stowed positions, the first mounting arm structure extending outwardly from the first pivot mount member and then downwardly toward the first foot platform; and
wherein the second mounting arm structure includes a second pivot mount member that affords, at least in part, pivotal movement of the second foot platform between the in-use and the stowed positions, the second mounting arm structure extending outwardly from the second pivot mount member and then downwardly toward the second foot platform.

6. The device of claim 1, wherein, in both the stowed and the in-use positions, the riding surface of the first foot platform is located outside the envelope of the first rim.

7. The device of claim 1, wherein, in both the stowed and the in-use positions, the riding surface of the first foot platform is located outside the envelope of the wheel structure.

8. The device of claim 1, wherein the first and second pivot axes are non-colinear.

9. An auto-balancing transportation device, comprising:
a wheel structure having a motor that drives the wheel structure;
first and second foot platforms that are located on opposite sides of the wheel structure and that pivot between an in-use position and a stowed position;
a first mounting arm structure coupled to and supporting the first foot platform and a second mounting arm structure coupled to and supporting the second foot platform;
a position sensor and a control circuit, the control circuit driving the motor towards auto-balancing the device based on data from the position sensor;
wherein the first mounting arm structure includes a first pivot mount member that affords, at least in part, pivotal movement of the first foot platform between the in-use and the stowed positions, the first mounting arm structure extending outwardly from the first pivot mount member and then downwardly toward the top of the first foot platform; and
wherein the second mounting arm structure includes a second pivot mount member that affords, at least in part, pivotal movement of the second foot platform between the in-use and the stowed positions, the second mounting arm structure extending outwardly from the second pivot mount member and then downwardly toward the top of the second foot platform.

10. The device of claim 9, wherein the wheel structure includes a at least a first and a second tire, and wherein the first and second tires define first and second wheel envelopes, respectively, and a pivot axis of the first foot platform is within the first wheel envelope and a pivot axis of the second foot platform is within the second wheel envelope.

11. The device of claim 9, wherein the first mounting arm structure and the first foot platform pivot about a first pivot axis and the second mounting arm structure and the second foot platform pivot about a second pivot axis, distinct from the first pivot axis.

12. The device of claim 11, wherein the first and second pivot axes are located within the envelope of the wheel structure and the riding surfaces of the first and second foot platforms are located outside of the envelope of the wheel structure.

13. The device of claim 9, wherein the pivot axes of the first and second platforms are non-colinear.

14. The device of claim 9, wherein the first mounting arm structure and the first foot platform pivot about a first pivot axis and the second mounting arm structure and the second foot platform pivot about a second pivot axis; and wherein, when the device is vertical and in the in-use position, the level of the first foot platform is below the level of the first axis and the level of the second foot platform is below the level of the second axis.

15. The device of claim 14, wherein the first and second pivot axes are located within the envelope of the wheel structure and the riding surfaces of the first and second foot platforms are located outside of the envelope of a rim of the wheel structure.

16. An auto-balancing transportation device, comprising:
a wheel structure having at least a first tire and a rim structure to which the first tire is mounted;
a motor that drives the wheel structure;
first and second foot platforms that are located on opposite sides of the wheel structure and that pivot between an in-use position and a stowed position;
a first mounting arm structure coupled to and supporting the first foot platform and a second mounting arm structure coupled to and supporting the second foot platform;
a position sensor and a control circuit, the control circuit driving the motor towards auto-balancing the device based on data from the position sensor;
wherein a first pivot axis for the first foot platform is located within the envelope of the wheel structure and a second pivot axis for the second foot platform is located within the envelope of the wheel structure;
wherein the riding surfaces of the first and second foot platforms are located outside of the envelope of the rim structure; and
wherein the first and second pivot axes are non-colinear.

17. The device of claim 16, wherein the riding surfaces of the first and second foot platforms are located outside of the envelope of the wheel structure.

18. The device of claim 16, wherein, when the device is vertical and in the in-use position, the level of the first foot platform is below the level of the first axis and the level of the second foot platform is below the level of the second axis.

19. The device of claim 16, wherein the first mounting arm structure includes a first pivot mount member that affords, at least in part, pivotal movement of the first foot platform between the in-use and the stowed positions, the first mounting arm structure extending outwardly from the first pivot mount member and then downwardly toward the top of the first foot platform; and wherein the second mounting arm structure includes a second pivot mount member that affords, at least in part, pivotal movement of the second foot platform between the in-use and the stowed positions, the second mounting arm structure extending outwardly from the second pivot mount member and then downwardly toward the top of the second foot platform.

20. The device of claim 16, further comprising a second tire mounted to the rim structure, and wherein the first pivot axis is within the first wheel envelope and the second pivot axis is within the second wheel envelope.

* * * * *